US009509673B2

(12) United States Patent
Parks et al.

(10) Patent No.: US 9,509,673 B2
(45) Date of Patent: Nov. 29, 2016

(54) AUTOMATED ACCOUNTS FOR MEDIA PLAYBACK

(71) Applicant: Google Inc., Mountain View, CA (US)

(72) Inventors: Jason Parks, Austin, TX (US); Timothy Kilbourn, Sunnyvale, CA (US); Jeremy Ellington, San Jose, CA (US); Cyrus Phiroze Master, Ogden, UT (US); Joe Freeman Britt, Jr., Los Altos, CA (US); Jeremy Lyon, Sunnyvale, CA (US); Eugene Koh, San Francisco, CA (US); Owen Daniel Otto, Berkeley, CA (US); Michael Jonathon Chen, Mountain View, CA (US); Jason Simmons, Palo Alto, CA (US); Dmitry Dolinsky, San Francisco, CA (US); Jeffrey David Yaksick, Mount Hamilton, CA (US); Manuel Roman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/467,248

(22) Filed: Aug. 25, 2014

(65) Prior Publication Data
US 2014/0366102 A1 Dec. 11, 2014

Related U.S. Application Data

(63) Continuation of application No. 13/599,786, filed on Aug. 30, 2012, now Pat. No. 8,819,841.

(60) Provisional application No. 61/664,676, filed on Jun. 26, 2012.

(51) Int. Cl.
H04L 29/06 (2006.01)
G06F 21/10 (2013.01)

(52) U.S. Cl.
CPC ............... *H04L 63/08* (2013.01); *G06F 21/10* (2013.01); *H04L 65/1066* (2013.01); *H04L 65/60* (2013.01); *G06F 2221/0786* (2013.01); *G06F 2221/2151* (2013.01)

(58) Field of Classification Search
CPC ... H04L 63/00; H04L 63/08; H04L 63/0807; H04L 63/0823; H04L 65/1066; H04L 65/60; G06F 21/00; G06F 21/10; G06F 21/30; G06F 21/33; G06F 21/34; G06F 21/44; G06F 21/62; G06F 21/6218; G06F 2221/0786; G06F 2221/2151
USPC ....................................................... 726/4, 26
See application file for complete search history.

(56) References Cited

U.S. PATENT DOCUMENTS 6,694,431 B1 * 2/2004 Binding et al. ............... 713/160
7,840,631 B2 11/2010 Farcasiu (Continued)

OTHER PUBLICATIONS

Damgaard, et al., "MEET: A Technical Framework Enabling Ubiquitous Music in a Social Context", Department of Computer Science, Aalborg University. pp. 1-10. Jan. 17, 2011.

(Continued)

Primary Examiner — Yogesh Paliwal
(74) Attorney, Agent, or Firm — Morris & Kamlay LLP

(57) ABSTRACT

Content stored on a server may be selected using a user device and enabled on a central device. The identity of the central device may be authenticated without transmitting user credentials corresponding to the user, user device, user account, etc. A central device identifier can be sent to the server via the user device. An encrypted version of the central device identifier may be returned to the user device and to the central device. The central device can send the encrypted and unencrypted version of the identifier to the server, and the server can transmit the desired content to the remote device based on a comparison of the encrypted and unencrypted identifier.

25 Claims, 3 Drawing Sheets

(56) References Cited

U.S. PATENT DOCUMENTS

| | | |
|---|---|---|
| 7,895,445 B1 | 2/2011 | Albanese et al. |
| 2004/0172561 A1 | 9/2004 | Iga |
| 2005/0108551 A1 | 5/2005 | Toomey |
| 2006/0177066 A1* | 8/2006 | Han ............... H04L 63/061 380/277 |
| 2006/0294244 A1* | 12/2006 | Naqvi et al. ............ 709/227 |
| 2008/0133708 A1 | 6/2008 | Alvarado et al. |
| 2009/0049297 A1 | 2/2009 | Omernick et al. |
| 2009/0292830 A1* | 11/2009 | Nagashima ........... G06F 17/30 710/13 |
| 2010/0095332 A1* | 4/2010 | Gran et al. ................ 725/93 |
| 2010/0251352 A1 | 9/2010 | Zarchy et al. |
| 2011/0099612 A1* | 4/2011 | Lee et al. ................... 726/6 |
| 2011/0321081 A1 | 12/2011 | Lee et al. |
| 2012/0005311 A1 | 1/2012 | Livingston et al. |
| 2012/0030366 A1 | 2/2012 | Collart et al. |
| 2012/0096272 A1 | 4/2012 | Jasper et al. |

OTHER PUBLICATIONS

International Search Report and Written Opinion of PCT/US2013/046544, mailed Apr. 13, 2015.

* cited by examiner

AUTOMATED ACCOUNTS FOR MEDIA PLAYBACK

RELATED APPLICATIONS

This application is a continuation of U.S. application Ser. No. 13/599,786, filed Aug. 30, 2012, which claims priority to U.S. Provisional Application No. 61/664,676, filed Jun. 26, 2012, the disclosure of each of which is incorporated by reference in its entirety.

BACKGROUND

A conventional user request to enable or access media content may require transmitting the request along with certain credentials related to the request and/or a user remote device to a local or remote content server. Such a transmission may be capable of interception by a third party with or without the knowledge or permission of the user. As a specific example, the third party may be a hacker attempting to retrieve user credentials related to the user remote device.

For security purposes, it may be beneficial to prohibit any user credentials from being transmitted to and/or from the central device. Restricting the transmission of user credentials may be beneficial in the event of a security breach, leak of data during transmission, misplaced data, or the like.

BRIEF SUMMARY

According to implementations of the disclosed subject matter, a media request from a user phone may be received at a central device. An email address of a robot account corresponding to the central device may be sent to the user phone. A media identifier (ID) and the email address may be sent to a media provider from the user phone, wherein the media ID can correspond to the media request. The share token and the media ID can be received at the central device and a media playback request may be sent from the central device to the music provider. The media play back request may comprise sending the share token, email address, and the media ID. The email address may be compared to the share token at the music provider. The media corresponding to the media ID may be received from the music provider at the central device and the media may be played.

According to implementations of the disclosed subject matter, a first content activation request may be received from a user device. An identifying address corresponding to a robot account may be sent to the user device. A share token may be received from the user device, the share token being generated by a server remote from the user device and comprising the identifying address and a content identifier corresponding to the first content activation request. The share token may be an encrypted protocol buffer. The identifying address may correspond to an email address for a robot account. A retrieval content activation request may be sent to the server, the retrieval content activation request comprising the share token. Content may be received and enabled based on comparing the identifying address and the share token. The content may be a media file which may be an audio file or a video file. The user device may be a mobile device or a personal computing device. The share token may comprise a timestamp and a time corresponding to the retrieval content activation may be compared to the share token. The time corresponding to the retrieval content activation may be determined to correspond to data in the share token and the content may be received based on the determination. The determination may comprise determining a time differential between the time corresponding to the retrieval content activation and the data in the share token, and, determining that the time differential is below a threshold. A second content activation may be received from a second user device, and the second content may be added to a content queue. An identifying address corresponding to a robot account may be sent to the second user device. A second share token may be received from the second user device, the share token comprising the identifying address and a content identifier corresponding to the second content activation request. A second retrieval content activation request may be sent to the server, the second retrieval content activation request comprising the second share token. A second content may be received and activated based on comparing the identifying address and the second share token. The first user device and the second user device may be in communication proximity to the central device and either the first user device and/or the second user device may be approved by a master user prior to submitting content activation requests. The first user device or the second user device or both may be assigned control permissions which may include one or more of a play element, a pause element, a fast forward element, a slide element and a skip element. The content retrieval request may be sent to a media server that authenticates the robot account and stores at least one media content item.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
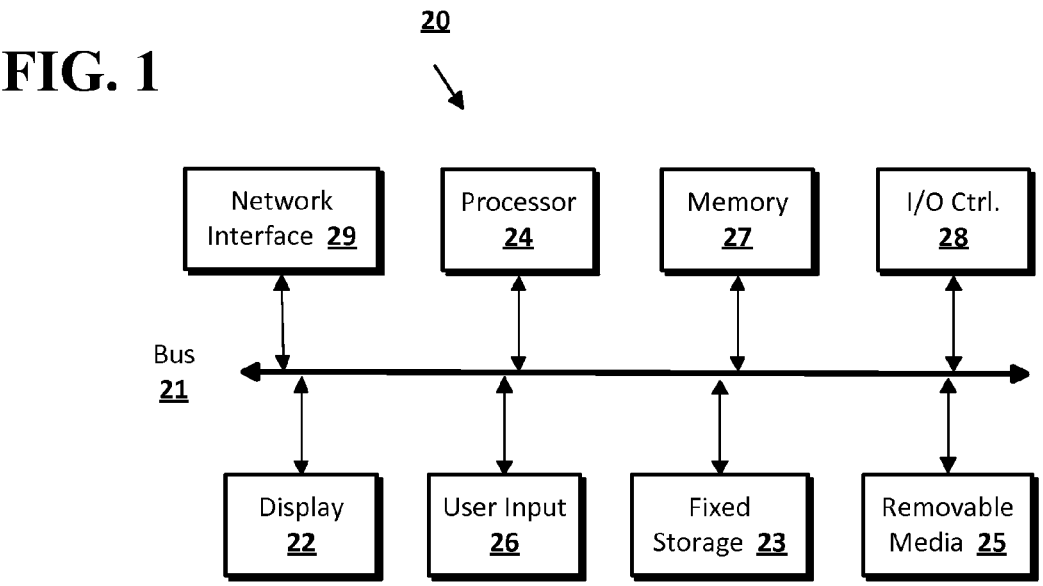
FIG. 1 shows a computer according to an implementation of the disclosed subject matter.

Communication between user devices, servers, or other components generally often requires an exchange of credentials to authorize the communication. However, for security considerations, it may be undesirable to communicate with a central device using information related to a user credentials or a remote device when requesting content from a server. According to an implementation of the disclosed subject matter, such transfer of credentials may be avoided, for example, when a user selects a media item on one device to be enabled on a central device.

For example, a user can select a song on her mobile phone to be played on a speaker located in the user's living room that is not physically connected to the user's mobile phone. The song may not be stored on the user's mobile phone; rather, it may be stored on a remote server. According to implementations of the disclosed subject matter, when the user selects a song from her mobile phone to be played on an external speaker, the speaker can send robot account information to the mobile phone. The robot account can be an account corresponding to the speaker and can include identification information associated with the speaker. No user specific information is transmitted during this interaction. The mobile phone can then transmit the robot account information and the requested song information to a media server that stores the song. For example, the mobile phone may transmit the robot account ID and the name of the song to the remote server. The remote server can then verify the user's identity and access rights to the song. If verified, the remote server can package the received information into an encrypted share token and send the share token to the user's mobile phone. The speaker can receive the encrypted share token from the user's mobile phone, without transmission of any user credentials, and transmit the encrypted share token to the remote server along with speaker identifying information. The remote server can authenticate the speaker by matching the information within the share token with the speaker identifying information. If authenticated, the remote server can send the song to the speaker and the speaker can play the song. Thus, according to implementations of the disclosed subject matter, authorization suitable to allow playback of media items may be obtained, without requiring a potentially undesirable transmission of user credentials.

According to an implementation of the disclosed subject matter, user credentials may include identifying information regarding a user account, a user, a remote device, an account associated with the remote device, or the like. The user credentials may be in the form of numbers, usernames, IDs, alphanumeric code, symbols, or any other identifying designators and may enable access to public, restricted, private, identifying, or compromising user information. The content request can include selecting content from a remote device, such as a mobile phone, and subsequent content activation at the central device, such as a device capable of content playback in the user's living room. Instead of using user credentials or remote device information, identifying information specific to the central device can be used to authorize the content delivery and activation. For example, as discussed herein, a central device may have a dedicated email account or other similar account assigned to it. Accordingly, if a user uses a remote device to select the content for activation on a central device, then it may be preferable to transmit identifying information related to only that central device, without requiring user- or device-specific information to be sent to the central device. By limiting the exposure of information specific to the user or the remote device, the security risk of mishandling such information may be significantly diminished.

According to implementations of the disclosed subject matter, a user may control or select content using a remote device such as, but not limited to, a mobile phone, tablet, laptop, desktop, remote control, dashboard, or the like. The content may be controlled or selected based on, but not limited to, user touch input, force input, voice input, capacitive input, tactile input, motion input, or the like. The content may play or activate on a device other than the remote device. For example, a user may select content using her mobile phone. The content selected by the user may be activated on a central device separate from the mobile phone, and may be played on a speaker system in the user's living room. The speaker system in the user's living room may not be physically connected to the user's mobile phone. Selected content may include any media item including, but not limited to, a clip, an audio clip, a video clip, a song, a video, a movie, a television show, a documentary, a vibration, visualization, or the like.

The desired content may be stored on a content server or other similar system, and/or it may be accessed by communicating with the content server. The content server may be local to the user and/or the central device or, alternatively, may be a remote or cloud based server. The server may be accessible via any acceptable connection including, but not limited to, a physical connection, a wired connection, a wireless connection, a Bluetooth connection, a Wifi connection, a network connection, a cellular connection, or the like. For example, a content server that stores or maintains a record of media content such as music or movies purchased by a user may be a remote content server accessible via a network connection.

Figure 3:
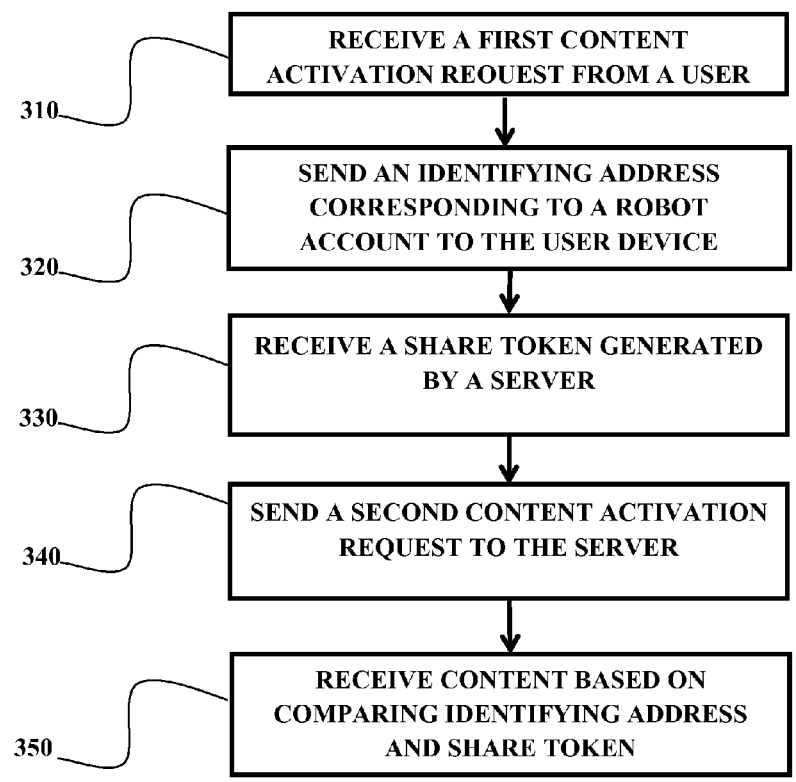
FIG. 3 shows an example process for enabling content playback by a central device according to an implementation of the disclosed subject matter.

FIG. 3 is a flowchart outlining an example implementation of the disclosed subject matter. As shown in step 310, a central device may receive a content request based on a user input at a remote device. The content request may be received via any acceptable communication means including, but not limited to, a physical connection, a wired connection, a wireless connection, a Bluetooth connection, a Wifi connection, a network connection, a cellular connection, or the like. At step 320, the central device may send an identifying address corresponding to a robot account specific to the central device to the remote device. The robot account may be created using a cloud bridge when the central device is provisioned for the first time or subsequently reset and re-provisioned. For example, when the central device is first configured for use in providing content, it may have a robot account assigned to it. Existing robot accounts may be tracked at a central location, such as a database associated with a particular media providing service, and/or they may be assigned based upon information unique to the central device such as a GUID, serial number, or other similar identifier. The cloud bridge may create a certificate of authenticity for the central device which may be used to authenticate the central device with a remote server or user device. The robot account may not be a fully operative user account such that it may not include certain characteristics that a user account does. For example, the robot account may not be capable of sending or receiving messages. The robot account may manage or back up user settings. For example, if a user prefers to use the central device in a specific manner, e.g., to access media at a certain volume, at a certain time, etc., then the robot account may store and implement those preferences. The cloud bridge used to provision the robot account may also allow remote communication between a remote device and the central device. For example, the user may make a content selection using a remote device, while at work. The cloud bridge may communicate that selection to the central device located within a user's home.

The remote device may transmit the received information to a central server, which may generate a share token and send it back to the remote device. At step 330, the central device may receive the share token from the remote device. At step 340, the central device may send a content activation request to the server, the request containing the share token and the robot account specific information. As described herein, at step 350, the content may be received by the central device based on a comparison of the information in the share token and the identifying information transmitted by the central device to the server.

Figure 4:
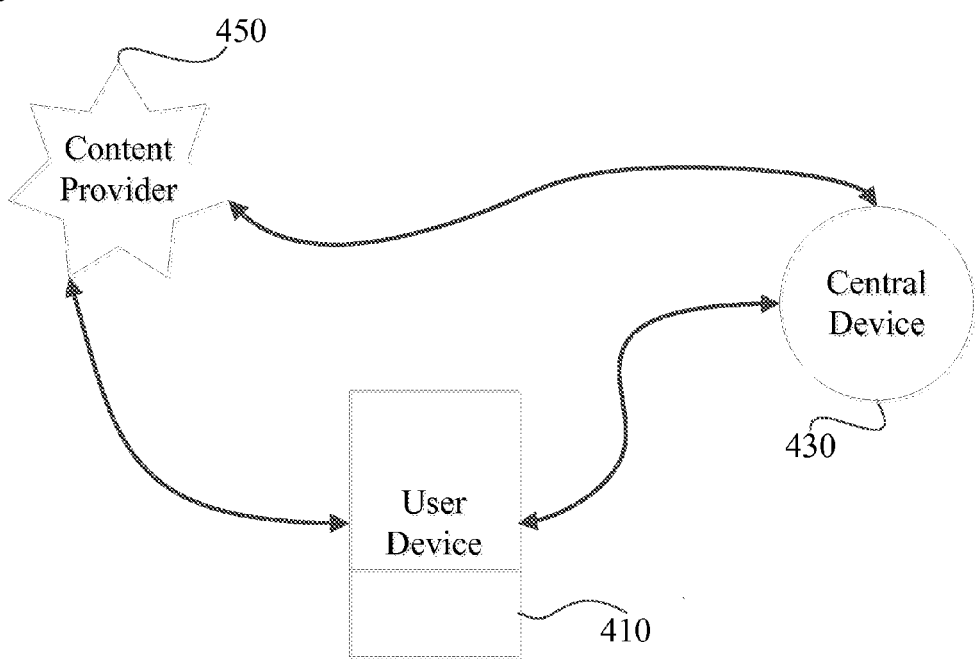
FIG. 4 shows an example arrangement for enabling content playback according to an implementation of the disclosed subject matter.

As an example, according to implementations of the disclosed subject matter, a central device 430, as shown in FIG. 4, may receive a first content request. The content request may be made by a user selection using a remote device 410, or it may be generated automatically by the remote device 410. For example, a user may select the title of a song using the user's mobile phone. The content request may request activation of the content corresponding to the user selection at the central device 430. For example, the user may select the song title on her mobile phone to have the corresponding song play on a central device located in the user's living room.

The central device may send identifying information to the remote device 410. The identifying information may be a central device identifier corresponding to the central device 430. The central device identifier can be an identifier corresponding to a robot account associated with the central device 430. A "robot account" refers to, for example, an email or similar communication account or channel that identifies the central device and may automatically respond to requests. Such a request typically will have a pre-defined format and specific types of pre-defined data, which can then be processed by a computer system that manages the robot account. The central device identifier may include any acceptable identifier including, but not limited to, an email account, a numerical identifier, an alphanumeric identifier, an encrypted identifier, a code, any combination of symbols, or the like. As a specific example, the central device identifier may be an email address corresponding to a robot account associated with the central device 430. Notably, the central device identifier may omit any and all user credentials including, but not limited to, identifying information regarding a user account, a user, a remote device, an account associated with the remote device, or the like. Accordingly, the central device 430 may send identifying information to the remote device 410 such that no user credentials or other identifying information are transmitted. In continuing the example, the central device may send the email address corresponding to the robot account associated with the central device to the user's mobile device. In general, a "robot account" is not associated with a particular user other than through association with a device that may be owned by a particular user. The robot account typically is not used directly by the user, but rather may be restricted to automated processes and techniques as disclosed herein.

The remote device may receive the central device identifier from the central device 430. The remote device may transmit the central device identifier and a content identifier to a content server 450, and may do so without including any user credentials in the data sent to the content server. That is, the message sent by the remote device to the content server may omit any user credential. As disclosed elsewhere herein, this may allow for the content server to determine that the user is authorized to receive the requested media, without requiring transmission of a user credential. The content identifier may correspond to the content being requested for activation and may include, but is not limited to, a title, a numerical identifier, an alphanumeric identifier, an encrypted identifier, a code, any combination of symbols, or the like. For example, the content identifier may be the title of a song being requested by a user. Alternatively, the content identifier may be a proprietary identification number corresponding to the song. The content server 450 may receive the central device identifier as well as the content identifier and generate a share token which may be encrypted. The share token may be generated based on at least a central device identifier and a content identifier. Alternatively, the share token may be generated based on at least a central device identifier, a content identifier, and a timestamp. The timestamp may be or may correspond to the time that the content server received the central device identifier and the content identifier. The content server 450 may send the share token to the remote device 410.

Continuing the previous example, the user's mobile device may receive the robot account name corresponding to the central device. It may send the robot account name as well as the title of the song being requested for playback to a cloud based server. The cloud based server may generate an encrypted share token based on the robot email account name, the title of the song, and a timestamp corresponding to the time when the cloud based server received communication from the user mobile device. The cloud based server may then send the encrypted share token to the user mobile device. Typically, the cloud based server or similar media service may already be able to identify the user based upon the source of the request, because the user is already logged in to the service, or based upon previously-provided credentials that identify the user as being authorized to access various media items. Thus, via the share token, the cloud based service may link an authorized user with those media items that the user is authorized to access, without requiring further transmission of the user's credentials to or from the central device.

The central device 430 may receive the share token from the remote device 410, the share token also omitting user credentials to limit the risk of a security leak corresponding to the user credentials. The central device 430 may transmit a content retrieval request to the content server 450 by sending the share token as well as the central device identifier to the content server 450. The content server 450 may compare the central device identifier with the encrypted information within the share token. For example, the content server 450 may compare a robot account name corresponding to the central device 430 with the encrypted account name within the share token. Based on the comparison and the encrypted content identifier within the share token, the content server may transmit the requested content to the central device 430. For example, if the email account of the central device matches the encrypted robot account name within the share token, then the content server 450 may send a song corresponding to a song ID within the share token to the central device 430.

The content server 450 may compare the encrypted timestamp within the encrypted share token with the time that the content server 450 receives a content request from the central device 430. Based on the comparison between the times, the content server 450 may accept or reject the content request. The content server 450 may select to reject the content request if the time duration between the encrypted timestamp within the share token and the time that the content server 450 receives the content request is greater than a threshold. The threshold may be predetermined, or, the threshold may be determined by the implementation based on one or more factors. The factors may include, but are not limited to, time, connection speed, user volume, content request volume, or the like. For example, the predetermined threshold may be 60 seconds. The content server may receive a content request from the central device at 12:00:15 PM. If the encrypted timestamp within the share token received with the content request correspond to 11:59:00 AM, the time differential between the encrypted time stamp and the time of receiving the content request is 75 seconds. Accordingly, the remote server may reject the content request as 75 seconds is greater than the acceptable threshold of 60 seconds. Similarly, if the timestamp within the share token is 12:00:10 PM, the time difference is 5 seconds and the remote server may accept the content request.

The central device 430 may contain content activation capabilities. Accordingly, the central device 430 may activate the content based on receiving content from the content server 450. Content activation may include enabling the content for use or enjoyment by the user or remote device, such as playing, displaying, copying, projecting, or other access to the content, or the like. For example, the central device may contain speakers or may be able to output content to external speakers. If the central device receives a song or authorization to play a song from the content server, it may play the song using the built-in or external speakers. Alternatively, the central device may be capable of displaying video, or may be physically or wirelessly connected to an object capable of displaying video. When the central device receives a video or authorization to play a video from the content server, it may play the video using the physically or wirelessly connected object capable of displaying video.

In an illustrative example of an implementation of the disclosed invention, a user navigates to a playlist on her mobile phone. The playlist may list songs available for playback, such as songs that the user has previously purchased from a remote or cloud-based system. The songs may be stored at least on a remote or cloud-based server. The user selects an individual song, e.g., "Flashy" by The Kennedys, on her mobile device. The mobile device may have been previously configured to play a selected song using an external central device located in the user's living room, such as a media system, a dedicated playback device, or the like. The mobile phone communicates with the central device and receives, from the central device, a robot account corresponding to the central device, e.g. "livingroom@device.com". The mobile device sends the robot account name and the title and artist corresponding to the selected song to the remote server. In this example, the remote server receives "Flashy", The Kennedys, and livingroom@device.com from the mobile phone. The remote server notes the time the request is received, e.g., 12:00 PM on Mar. 1, 2008.

The remote server may be configured to encrypt the information it receives from the mobile phone as well as the timestamp, and/or to generate a share token which contains the data ("Flashy", The Kennedys, livingroom@device.com, 12 PM on Mar. 1, 2008) in encrypted form. The remote server then transmits the share token to the user's mobile phone, which in turn transmits the share token to the central device. The central device may then request the song from the remote server by transmitting the share token as well as the central device identifier (livingroom@device.com) to the remote server at 12:00:15 PM on Mar. 1, 2008. The remote server may compare the encrypted timestamp (12 PM on Mar. 1, 2008) to the time the content request was received (12:00:02 PM on Mar. 1, 2008). The remote server may determine that time differential of 2 seconds between the encrypted timestamp and time of the content request is below a predetermined threshold, such as 60 seconds, and that the central device identifier (livingroom@device.com) is the same or similar to the encrypted central device identifier (livingroom@device.com). Based on both the determinations, the remote server retrieves a stored file corresponding to the song "Flashy" by The Kennedys, and transmits or streams the song to the central device for playback in the user's living room. It will be understood that this example is provided for illustration only, and that deviations, additions, and omissions from the particular steps described may be made without departing from the scope of the disclosed subject matter. For example, the described timestamp comparison may be omitted, a different time threshold may be used, and/or more or less information may be included in the share token.

According to an implementation of the disclosed subject matter, the owner of the central device may be designated as a master user. The master user may configure the central device such that any other user in a close proximity to the central device may be able to request media activation from the central device. Alternatively, the master user may give access to specific users, and those specific users may then be able to request media activation from the central device. The access may be given based on other user accounts, user phones, phone numbers, or any other applicable identifier. For example, the master user may designate three phone numbers corresponding to three phones to have access rights. Accordingly, a user using any one of those three phones may also request content activation. The content activation may be carried out according to the techniques disclosed herein. Namely, the content activation associated with any of the three approved phones may be carried out such that no user information is transmitted when communicating with the central device. More generally, the master user may configure any combination of users, user devices, access methods, and the like to define those users and devices that are allowed to access content via the central device, as well as the specific content or content types that are available to each user or device.

The master user may also assign specific permission rights or permission levels to the specific users or types of users. The permission rights may allow an approved user to control the media playback by allowing the user to pause, play, stop, fast-forward, rewind, skip the media, or the like. A different user may not have the same rights and may only be able to add media without being able to control the playback. A certain permission level may allow a user to have more rights than another user with a lower permission level. For example, a user with level 3 permission rights may be able to skip a song that is currently playing but may not be able fast forward the song to get to a different location within the song. However, a user with level 4 permission rights may be able to skip a song that is currently playing and also to skip to a different location within the currently playing song.

As another example, the central device may be configured to grant access or permission rights based on the proximity of a user to the central device. A user that is further away from the central device may not be able to request content playback. However, if the user approaches the central device and enters a predetermined physical parameter relative to the central device, then the user may be able to request content playback. Further, a user that is further away may have fewer permission rights or be designated a lower permission level in comparison to a user that is closer to the central device. The user's proximity to the device may be determined by wireless signal strength, GPS tracking, specific area or room based tracking, Wi-Fi hotspot location based tracking, line of sight racking, or the like, or a combination thereof.

The central device may receive multiple media activation requests from the one or more users. This may occur such that multiple users can request media playback within a period that is shorter than the duration of the currently activated media. While the users request the media items, a different media item may be activated (playing). When the central device receives multiple media requests, it may create a queue of media items. The items in the queue may be played in the order that they were selected, may be shuffled randomly, or play according to any commonly known playback technique. The central device may buffer subsequent media items while a media item is active. The buffering may be conducted by downloading all or part of the subsequent media item, instructing the server prepare to transmit a subsequent media item, or by any applicable buffering technique.

To add a media item to the queue or to activate the media item, the central device may verify that at least one of the users with authorization to request media activation also has authorization to access the media item. For example, the central device will only actuate or add a media item to the queue if at least one of the users has access to that media item. The access may be based on a music service a user is subscribed too or a media item that a user has purchased. The verification can be conducted without exchanging any user credentials between the user device and central device as disclosed herein.

Notably, implementations of the presently disclosed subject matter do not require any user credentials to be transmitted to the remote server or any other external device that may be hosting the requested media. However, by using the robot account and share token as disclosed herein, it may be possible to determine that the requesting user is authorized to access the requested media, that the requesting central device is authorized to receive the requested media, for how long the authorization is valid, etc. Thus, user access and authorization rights may be maintained, without requiring potentially-sensitive authentication data to be transmitted between the user's device and remote servers that host or manage the requested media.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
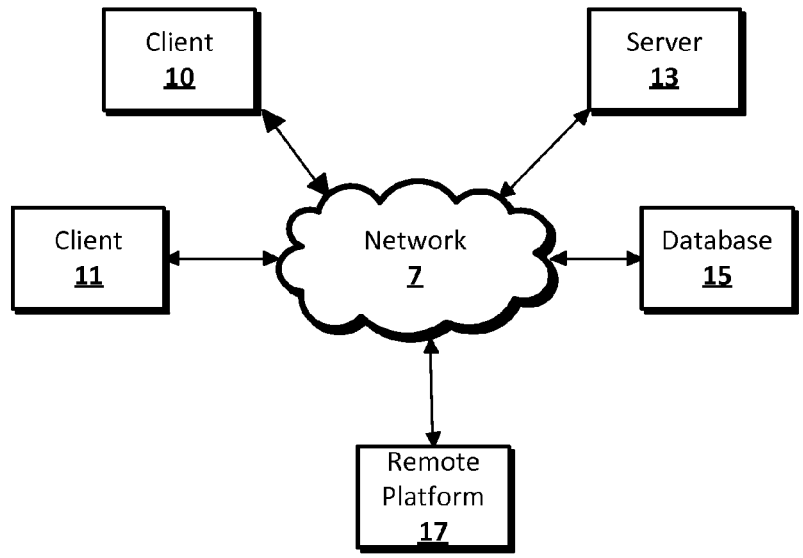
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving a first content activation request from a first device, the first content activation request omitting user identifying credentials;
accepting the request when the first device is within a predetermined physical proximity of a second device;
assigning a permission level to the first device based on a proximity of the first device to the second device, where a higher permission level is assigned when the first device is closer to the second device;
receiving an identifying address corresponding to the second device;
providing the first content to the second device based on the identifying address;
receiving a control command from the first device; and
causing the first content to be played on the second device based on the control command and the assigned permission level.

2. The method of claim 1, wherein the first content comprises a media file.

3. The method of claim 2, wherein the media file comprises an audio file.

4. The method of claim 2, wherein the media file comprises a video file.

5. The method of claim 2, further comprising:
receiving a second content activation request from a third user device;
adding the second content to a content queue;
receiving an identifying address corresponding to the second device from the third user device;
providing the second content to the second device based on the identifying address; and
activating the second content.

6. The method of claim 5, wherein the first device and the third user device are in communication proximity to a central device.

7. The method of claim 5, wherein the first device and the third user device are approved by a master user prior to submitting content activation requests.

8. The method of claim 5, wherein the first device or the third user device is assigned control permissions.

9. The method of claim 8, wherein the control permissions includes at least one element selected from the group consisting of a rewind element, a play element, a pause element, a fast forward element, a slide element and a skip element.

10. The method of claim 1, wherein the first device comprises a mobile device.

11. The method of claim 1, wherein the first device comprises a personal computing device.

12. The method of claim 1, further comprising enabling the first content.

13. The method of claim 1, wherein the first content activation request comprises a timestamp.

14. The method of claim 13, further comprising:
comparing a current time to the time stamp;
determining that the current time is within a threshold amount of time from the time stamp; and
providing the first content based on the determination.

15. A system comprising:
a second device including circuitry configured to receive a transmitted first content activation request from a first device, the receiving comprising accepting the request when the first device is within a predetermined physical proximity of the second device,
the second device further being configured to assign a permission level to the first device based on a proximity of the first device to the second device, where a higher permission level is assigned when the first device is closer to the second device, and further configured to transmit an identifying address corresponding to the second device to the first device when the request is accepted, to receive the first content based on the identifying address, receive a control command from the first device, and play the first content based on the control command and the assigned permission level.

16. The system of claim 15, wherein the first content comprises a media file.

17. The system of claim 15, wherein the first device comprises a mobile device.

18. The system of claim 15, wherein the first device comprises a personal computing device.

19. The system of claim 15, wherein the first content activation request comprises a timestamp.

20. The system of claim 19, further comprising a server configured to:
receive the first content activation request and the identifying address corresponding to the second device from the first device;
compare a current time to the time stamp;
determine that the current time is within a threshold amount of time from the time stamp; and
provide the first content based on the determination.

21. The system of claim 20, further configured to:
receive a second content activation request from a third device;
add the second content to a content queue;

receive the identifying address corresponding to the second device from the third device;

provide the second content to the second device based on the identifying address; and play the second content.

22. The system of claim 21, wherein the first device and the third device are in communication proximity to the second device.

23. The system of claim 21, wherein the first device and the third device are approved by a master user prior to submitting content activation requests.

24. The system of claim 21, wherein the first device or the third device is assigned control permissions.

25. The method of claim 24, wherein the control permissions includes at least one element selected from the group consisting of a rewind element, a play element, a pause element, a fast forward element, a slide element and a skip element.

\* \* \* \* \*